US012269761B2

(12) United States Patent
Lin et al.

(10) Patent No.: US 12,269,761 B2
(45) Date of Patent: Apr. 8, 2025

(54) METHOD FOR NR RADIO LINK MONITORING (RLM) AND EVALUATION PERIOD DETERMINATION

(71) Applicant: MEDIATEK INC., Hsin-Chu (TW)

(72) Inventors: Hsuan-Li Lin, Hsin-Chu (TW); Kuhn-Chang Lin, Hsin-Chu (TW)

(73) Assignee: MediaTek Inc., Hsinchu (TW)

( * ) Notice: Subject to any disclaimer, the term of this patent is extended or adjusted under 35 U.S.C. 154(b) by 0 days.

(21) Appl. No.: 18/227,916

(22) Filed: Jul. 29, 2023

(65) Prior Publication Data

US 2023/0416132 A1 Dec. 28, 2023

Related U.S. Application Data

(63) Continuation of application No. 17/313,710, filed on May 6, 2021, now abandoned, which is a continuation (Continued)

(51) Int. Cl.
*H04W 24/10* (2009.01)
*A01G 31/02* (2006.01)
(Continued)

(52) U.S. Cl.
CPC .............. *C02F 11/04* (2013.01); *A01G 31/02* (2013.01); *A01G 33/00* (2013.01); *A01K 63/042* (2013.01);
(Continued)

(58) Field of Classification Search
CPC ...... H04B 7/066; H04L 5/0053; H04W 24/10; H04W 28/06; H04W 56/001; H04W 56/005; H04W 76/27; H04W 76/28
(Continued)

(56) References Cited

U.S. PATENT DOCUMENTS

2014/0092761 A1 4/2014 Behravan et al. ............ 370/252
2014/0153526 A1 6/2014 Mazzarese ................... 370/329
(Continued)

FOREIGN PATENT DOCUMENTS

CN 103945446 A 7/2014
CN 107949064 A 4/2018
(Continued)

OTHER PUBLICATIONS

Taiwan IPO, office action for related TW patent application 108116308 (no English translation is available) dated May 11, 2020 (7 pages).
(Continued)

*Primary Examiner* — Harun Chowdhury
(74) *Attorney, Agent, or Firm* — Helen Mao; Imperium Patent Works

(57) ABSTRACT

Methods are proposed to define UE behavior for performing synchronization signal block (SSB) based radio link monitoring (RLM) and channel state information reference signal (CSI-RS) based RLM. In a first novel aspect, if CSI-RS based RLM-RS is not QCLed to any CORESET, then UE determines that CSI-RS RLM configuration is error and does not perform RLM accordingly. In a second novel aspect, SSB for RLM and RLM CSI-RS resources are configured with different numerologies. UE perform SSB based RLM and CSI-RS based RLM based on whether the SSB and CSI-RS resources are TDMed configured by the network. In a third novel aspect, when multiple SMTC configurations are configured to UE, UE determines an SMTC period and whether SMTC and RLM-RS are overlapped for the purpose of RLM evaluation period determination.

12 Claims, 5 Drawing Sheets

Related U.S. Application Data of application No. 16/447,961, filed on Jun. 21, 2019, now abandoned.

(60) Provisional application No. 62/688,450, filed on Jun. 22, 2018.

(51) Int. Cl.

| | |
|---|---|
| *A01G 33/00* | (2006.01) |
| *A01K 63/04* | (2006.01) |
| *A01K 63/06* | (2006.01) |
| *A01K 63/10* | (2017.01) |
| *A01M 31/00* | (2006.01) |
| *C02F 3/00* | (2023.01) |
| *C02F 3/32* | (2023.01) |
| *C02F 11/04* | (2006.01) |
| *H04B 7/01* | (2006.01) |
| *H04L 5/00* | (2006.01) |
| *H04L 27/26* | (2006.01) |
| *H04W 24/08* | (2009.01) |
| *H04W 56/00* | (2009.01) |
| *A01G 31/00* | (2018.01) |
| *C02F 101/16* | (2006.01) |
| *C02F 103/20* | (2006.01) |
| *H02S 10/10* | (2014.01) |
| *H04L 1/00* | (2006.01) |

(52) U.S. Cl.
CPC .......... *A01K 63/045* (2013.01); *A01K 63/047* (2013.01); *A01K 63/065* (2013.01); *A01K 63/10* (2017.01); *A01M 31/002* (2013.01); *C02F 3/006* (2013.01); *C02F 3/327* (2013.01); *H04B 7/01* (2013.01); *H04L 5/005* (2013.01); *H04L 5/0094* (2013.01); *H04L 27/2607* (2013.01); *H04W 24/08* (2013.01); *H04W 24/10* (2013.01); *H04W 56/001* (2013.01); *H04W 56/005* (2013.01); *A01G 2031/006* (2013.01); *C02F 2101/16* (2013.01); *C02F 2103/20* (2013.01); *C02F 2201/009* (2013.01); *C02F 2209/02* (2013.01); *C02F 2209/06* (2013.01); *C02F 2209/225* (2013.01); *C02F 2209/245* (2013.01); *C02F 2209/42* (2013.01); *H02S 10/10* (2014.12); *H04L 1/0026* (2013.01)

(58) Field of Classification Search
USPC .................................. 370/252, 329, 331, 350
See application file for complete search history.

(56) References Cited

U.S. PATENT DOCUMENTS

| | | | |
|---|---|---|---|
| 2015/0103777 A1 | 4/2015 | Chen et al. .................. 370/329 |
| 2019/0075006 A1 | 3/2019 | Yi ........................... H04L 27/26 |
| 2019/0166612 A1 | 5/2019 | Yokomakura ......... H04L 5/0048 |
| 2019/0254110 A1* | 8/2019 | He ........................ H04L 5/0048 |
| 2020/0404537 A1* | 12/2020 | Harada ................. H04L 5/0053 |
| 2021/0092697 A1 | 3/2021 | Harada ................. H04L 5/0044 |

FOREIGN PATENT DOCUMENTS

| | | | |
|---|---|---|---|
| TW | 201419777 A | 5/2014 | |
| WO | WO2018106043 A1 | 6/2018 | |
| WO | WO-2018232090 | 12/2018 | |
| WO | WO-2018232090 A1 * | 12/2018 | ........... H04B 7/0626 |

OTHER PUBLICATIONS

R4-1802538 3GPP TSG RAN WG4 Meeting #86, Ntt Docomo Inc., "Remaining Issues on Radio Link Monitoring based on SSB", Athens, Greece, Feb. 26-Mar. 2, 2018 (5 pages). *sections 2 and 3*.
R4-1802189 3GPP TSG-RAN WG4 #86, Intel., "SSB based RLM measurement period for DRX case", Athens, Greece., Feb. 26-Mar. 2, 2018 (4 pages).
R4-1802190 #GPP TSG-RAN4 Meeting #86, Intel Corp., "Discussion about evaluation period and indication interval for NR RLM", Athens, Greece, Feb. 26-Mar. 2, 2018 (3 pages).
R4-1802643 3GPP TSG-RAN WG4 Meeting #86, Huawei et al., "Further discussion on SSB based RLM requirements for NR", Athens, Greece, Feb. 26-Mar. 2, 2018 (3 pages).
3GPP TS 38.133 V15.0.0 (Dec. 2017), 3rd Generation Partnership Project; Technical Specification Group Radio Access Network; NR; Requirements for support of radio resource management (Release 15).
India IP Office prepared Search Report and Written Opinion for application 202027053630 dated Dec. 15, 2021 (7 pages).
R4-1802538, NTT Docomo, INC., "Remaining Issues on Radio Link Monitoring based on SSB", 3GPP TSG RAN WG4 Meeting#86, Feb. 26-Mar. 2, 2018, Athens, Greece.
International Search Report and Written Opinion of International Search Authority for PCT/CN2019/086438 dated Jun. 27, 2019 (8 pages).
Taiwan IPO, office action for related TW patent application 108121927 (no English translation is available) dated Nov. 18, 2020 (6 pages).
R4-1713768 3GPP TSG-RAN WG4 Meeting RAN4#85, Ericsson, "On remaining issues for NR RLM", Reno, Nevada, USA, Nov. 27-Dec. 1, 2017 (6 pages) *pp. 1-3, sections 2.1, 2.3*, pp. 5-6, sections 4*.
Balazs Bertenyi et al., "5G NR Radio Interface,", Journal of ICT Standardization, vol. 6, Combined Special Issue 1 & 2, Article No. 3, River Publishers, May 2018 *pp. 31-58, sections 5.1, 5.6*.
International Search Report and Written Opinion of International Search Authority for PCT/CN2019/092480 dated Sep. 27, 2019 (8 pages).
R4-1713768 3GPP TSG-RAN WG4 Meeting RAN4#85, Ericsson, "On remaining issues for NR RLM", Reno, Nevada, USA, Nov. 27-Dec. 1, 2017 (6 pages) *sections 2-3*.
R4-1806323 3GPP TSG-RAN WG4 Meeting #87, Intel Corp., "Discussion on Hypothetical PDCCH for CSI-RS based RLM", Busan, KR, May 21-25, 2018 (4 pages).
R4-1716861 3GPP TSG RAN WG1 NR adhoc #3, NTT Docomo et al., "offline summary for mobility (6.1.5)", Nagoya, Japan, Sep. 18-21, 2017 (3 pages).

* cited by examiner

METHOD FOR NR RADIO LINK MONITORING (RLM) AND EVALUATION PERIOD DETERMINATION

CROSS REFERENCE TO RELATED APPLICATIONS

This application is a continuation, and claims priority under 35 U.S.C. § 120 from nonprovisional U.S. patent application Ser. No. 17/313,710, entitled "Method for NR Radio Link Monitoring (RLM) and Evaluation Period Determination," filed on May 6, 2021, the subject matter of which is incorporated herein by reference. application Ser. No. 17/313,710, in turn, is a continuation, and claims priority under 35 U.S.C. § 120 from nonprovisional U.S. patent application Ser. No. 16/447,961, entitled "Method for NR Radio Link Monitoring (RLM) and Evaluation Period Determination", filed on Jun. 21, 2019, the subject matter of which is incorporated herein by reference. application Ser. No. 16/447,961, in turn, claims priority under 35 U.S.C. § 119 U.S. provisional application 62/688,450 entitled "Method for NR RLM and Evaluation Determination" filed on Jun. 22, 2018. The subject matter of which is incorporated herein by reference.

TECHNICAL FIELD

The disclosed embodiments relate generally to wireless communication, and, more particularly, to method and apparatus for radio link monitoring (RLM) based on Channel State Information reference signal (CSI-RS) in new radio (NR) systems.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. The Next Generation Mobile Network (NGMN) board, has decided to focus the future NGMN activities on defining the end-to-end requirements for 5G new radio (NR) systems.

For radio link monitoring (RLM) in NR, UE can be configured to measure synchronization signal (SS) blocks (SSB) and/or channel state information (CSI) reference signals (CSI-RS) to monitor radio link quality. In NR, SMTC (SSB measurement timing configuration) is provided for SSB RLM evaluation period determination. If multiple SMTC are present, how to determine the evaluation period for the overlap between RLM-RS and SMTC is ambiguous. How to map CSI-RS based RLM-RS into to one COntrol REsource SET (CORESET) for Physical downlink control channel (PDCCH) parameters determination is undefined. How to handle RLM when SSB for RLM and RLM CSI-RS resources are configured with different numerologies is undefined. Finally, the definition of overlapping between CSI-RS resource and SMTC window duration is ambiguous so that RLM measurement behavior is also ambiguous.

A solution is sought to define UE behavior for performing NR RLM.

SUMMARY

Methods are proposed to define UE behavior for performing synchronization signal block (SSB) based radio link monitoring (RLM) and channel state information reference signal (CSI-RS) based RLM. In a first novel aspect, if CSI-RS based RLM-RS is not QCLed to any CORESET, then UE determines that CSI-RS RLM configuration is error and does not perform RLM accordingly. In a second novel aspect, SSB for RLM and RLM CSI-RS resources are configured with different numerologies. UE perform SSB based RLM and CSI-RS based RLM based on whether the SSB and CSI-RS resources are TDMed configured by the network. In a third novel aspect, when multiple SMTC configurations are configured to UE, UE determines an SMTC period and whether SMTC and RLM-RS are overlapped for the purpose of RLM evaluation period determination.

In one embodiment, a UE receives core resource set (CORESET) configuration in a new radio (NR) network. The CORESET configuration comprises one or more CORESETs for the UE. The UE receives radio link monitoring (RLM) configuration comprising resource information of a plurality of channel state information reference signals (CSI-RSs) for RLM. The UE determines whether a configured CSI-RS for RLM is Quasi-Co-Located (QCLed) to any CORESET according to the resource information of the CSI-RSs. The UE performs RLM measurements using the configured CSI-RS for RLM only when the configured CSI-RS for RLM is QCLed to at least one CORESET.

In another embodiment, UE receives synchronization signal block (SSB) configuration for radio link monitoring (RLM) in a new radio (NR) network. The SSB occupies a first OFDM symbol having a first numerology. The UE receives channel state information reference signal (CSI-RS) configuration for RLM. The configured CSI-RS resource is allocated over a second OFDM symbol having a second numerology. The UE determines whether the SSB and the configured CSI-RS resource are TDMed responsive to the first numerology and the second numerology being different. The UE performs SSB based RLM and CSI-RS based RLM using the SSB and CSI-RS configuration for RLM and based on whether the SSB and the configured CSI-RS resource are TDMed.

In another embodiment, UE receives synchronization signal block (SSB) measurement timing configuration (SMTC) for radio link monitoring (RLM) in a new radio (NR) network. The UE determines an RLM evaluation period according to the SMTC configuration based at least on an SMTC periodicity. The UE performs CSI-RS based RLM using the determined RLM evaluation period.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
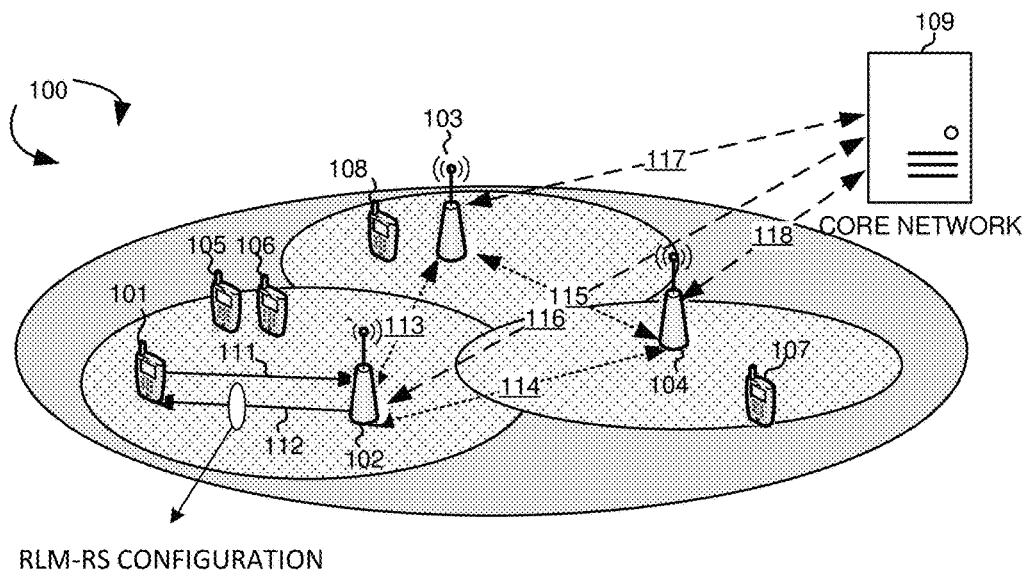
FIG. 1 illustrates a system diagram of a new radio (NR) wireless system with SSB and CSI-RS configured for radio link monitoring (RLM) in accordance with embodiments of the current invention.

FIG. 1 illustrates a system diagram of a new radio (NR) wireless system 100 with synchronization signal block (SSB) and channel state information reference signal (CSI-RS) configured for radio link monitoring (RLM) in accordance with embodiments of the current invention. Wireless communication system 100 comprises one or more wireless networks having fixed base infrastructure units, such as receiving wireless communications devices or base units 102 103, and 104, forming wireless radio access networks (RANs) distributed over a geographical region. The base units may also be referred to as an access point (AP), an access terminal, a base station (BS), a Node-B, an eNodeB, an eNB, a gNodeB, a gNB, or by other terminology used in the art. Each of the base unit 102, 103, and 104 serves a geographic area and connects to a core network 109 e.g., via links 116, 117, and 118 respectively. The base unit performs beamforming in the NR system, e.g., in both FR1 (sub7 GHz spectrum) or FR2 (Millimeter Wave frequency spectrum). Backhaul connections 113, 114 and 115 connect the non-co-located receiving base units, such as 102, 103, and 104. These backhaul connections can be either ideal or non-ideal.

A wireless communications device UE 101 in wireless system 100 is served by base station 102 via uplink 111 and downlink 112. Other UEs 105, 106, 107, and 108 are served by different base stations. UEs 105 and 106 are served by base station 102. UE 107 is served by base station 104. UE 108 is served by base station 103. Each UE may be a smart phone, a wearable device, an Internet of Things (IoT) device, a tablet, etc. For radio link monitoring (RLM) in NR, each UE can be configured to measure synchronization signal (SS) blocks (SSB) and/or channel state information (CSI) reference signal (CSI-RS). With explicit signaling, after UE is connected to a cell, the RLM RS configuration parameters can be configured through radio resource control (RRC) signaling via RadioLinkMonitoringRS, including RS type (SSB or CSI-RS) and RS ID. For CSI-RS, the parameters include CSI-RS Index that is linked to CSI-RS resource configuration, which further includes resource location in time and frequency domain and quasi-co-location (QCL) info through beam indication or transmission configuration indication (TCI) state. For SSB, the parameters include SSB Index that is used to derive SSB location in time domain. There is no QCL info for SSB. RLM RS configuration parameters can also be configured via implicit signaling, e.g., using the RS in TCI state of a COntrol REsource SET (CORESET) when no dedicated signaling for RLM in RRC is available (i.e., RadioLinkMonitoringRS is missing).

There are certain issues for SSB based RLM and CSI-RS based RLM in NR systems. First, SMTC (SSB measurement timing configuration) is provided for SSB RLM evaluation period determination. If multiple SMTC are present, how to determine the evaluation period for the overlap between RLM-RS and SMTC is ambiguous. Second, how to map CSI-RS based RLM-RS to one COntrol REsource SET (CORESET) for PDCCH parameter determination is undefined. Third, how to handle RLM when SSB for RLM and RLM CSI-RS resources are configured with different numerologies is undefined. Fourth, the definition of overlapping between CSI-RS resource and SMTC window duration is ambiguous so that RLM behavior, e.g., how to determine the RLM evaluation period is also ambiguous.

In accordance with one novel aspect, methods are proposed to define UE behavior for performing SSB based RLM and CSI-RS based RLM. In a first novel aspect, if CSI-RS based RLM-RS is not QCLed to any CORESET, then UE determines that CSI-RS RLM configuration is error and does not perform RLM accordingly. In a second novel aspect, SSB for RLM and RLM CSI-RS resources are configured with different numerologies (i.e., different SCS, CP). UE will perform SSB based RLM and CSI-RS based RLM only when the SSB and the configured CSI-RS resource are TDMed configured by the network. In a third novel aspect, when multiple SMTC configurations are configured to UE, UE determines an SMTC period for the purpose of RLM evaluation period. UE also determines whether SMTC window duration and RLM-RS resource are overlapped for the purpose of determining the RLM evaluation period.

Figure 2:
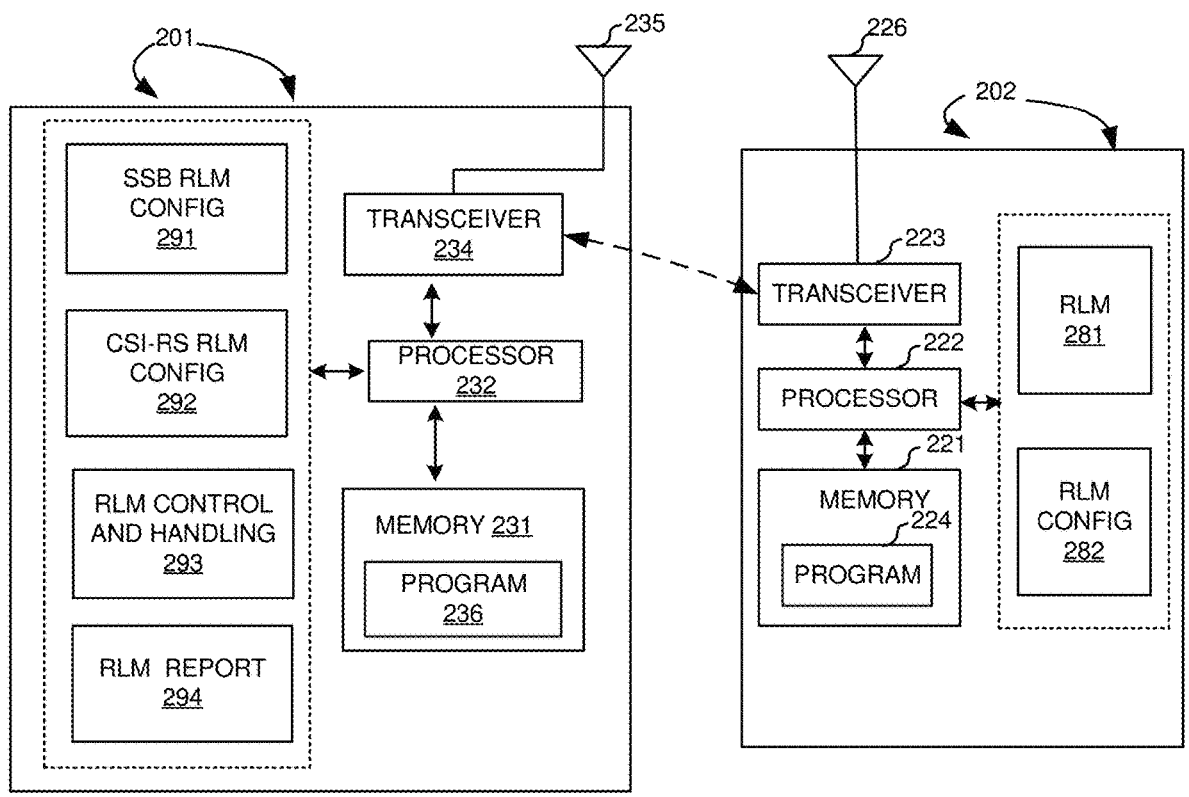
FIG. 2 shows simplified block diagrams of a UE and a BS in accordance with embodiments of the current invention.

FIG. 2 shows simplified block diagrams of a wireless devices, e.g., UE 201 and base station 202 in accordance with the current invention. Base station 202 has an antenna 226, which transmits and receives radio signals. A RF transceiver module 223, coupled with the antenna, receives RF signals from antenna 226, converts them to baseband signals and sends them to processor 222. RF transceiver 223 also converts received baseband signals from processor 222, converts them to RF signals, and sends out to antenna 226. Processor 222 processes the received baseband signals and invokes different functional modules to perform features in base station 202. Memory 221 stores program instructions and data 224 to control the operations of base station 202. Base station 202 also includes a set of control modules and circuits, such as an RLM circuit 281 that performs RLM and an RLM configuration circuit 282 that configures RLM for UEs and communicates with UEs to implement the RLM functions.

Similarly, UE 201 has an antenna 235, which transmits and receives radio signals. A RF transceiver module 234, coupled with the antenna, receives RF signals from antenna 235, converts them to baseband signals and sends them to processor 232. RF transceiver 234 also converts received baseband signals from processor 232, converts them to RF signals, and sends out to antenna 235. Processor 232 processes the received baseband signals and invokes different functional modules to perform features in mobile station 201. Memory 231 stores program instructions and data 236 to control the operations of mobile station 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines.

UE 201 also includes a set of control modules and circuits that carry out functional tasks. These functions can be implemented in software, firmware and hardware. A processor in associated with software may be used to implement and configure the functional features of UE 201. For example, an SSB based RLM configuration circuit 291 that configures SSB and SMTC windows for RLM; a CSI-RS based RLM configuration circuit 292 that configures CSI-RS resource for RLM; an RLM control and handling circuit 293 that determines whether and how to perform RLM based on the RLM configuration; an RLM report circuit 294 transmits RLM related reports to the network.

Figure 3:
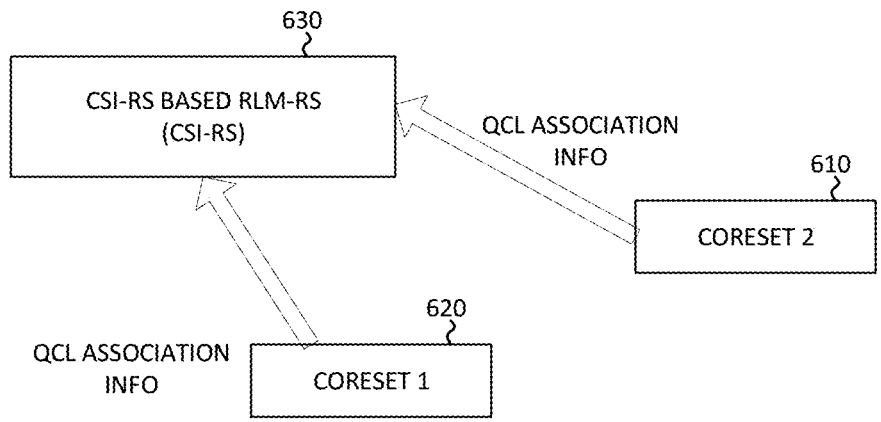
FIG. 3 illustrates control resource set (CORESET) configuration and CSI-RS configuration for RLM and their relationship in accordance with one novel aspect of the present invention.

FIG. 3 illustrates control resource set (CORESET) configuration and CSI-RS configuration for RLM and their relationship in accordance with one novel aspect of the present invention. As shown in FIG. 3, a base station can configure more than one CORESET for one UE, e.g., CORESET1 (610) and CORESET2 (620). The CORESETs are configured by the network through RRC signaling after UE is connected to a cell (i.e., UE only knows SMTC of the serving cell). The configuration parameters for CORESET include TCI state and CORESET ID. A TCI state indicates RS ID (i.e., CSI-RS ID or SSB index) and associated QCL type. A CORESET ID indicates the frequency domain resource location, duration, precoder, mapping type etc. of the CORESET. UE can determine CORESET based on different priority rules, e.g., based on CORESET index QCLed with the CSI-RS based RLM-RS.

In general, determining whether CSI-RS for RLM is QCLed to any CORESET requires time, frequency resource location, and QCL information. However, in some situations, UE may find that the CSI-RS based RLM-RS is not QCLed to any CORESET. Under such condition, UE can determine that the CSI-RS RLM configuration is error and does not perform the corresponding RLM functionality. This is because if the CSI-RS based RLM-RS is not QCLed to any CORESET, then the UE does not know how to receive control parameters over PDCCH. The 3GPP specification defines a first frequency range (FR1) and a second frequency range (FR2). In FR1 (e.g., sub7 GHz), QCL information comprises the reference for Doppler shift, Doppler spread, average delay and delay spread of the configured CSI-RS for RLM. In FR2 (e.g., mmWave), QCL information further includes spatial RX parameters, e.g. the RX beam. Therefore, QCL information in FR2 may be called spatial QCL information, and QCLed means the same RX beam.

Figure 4:
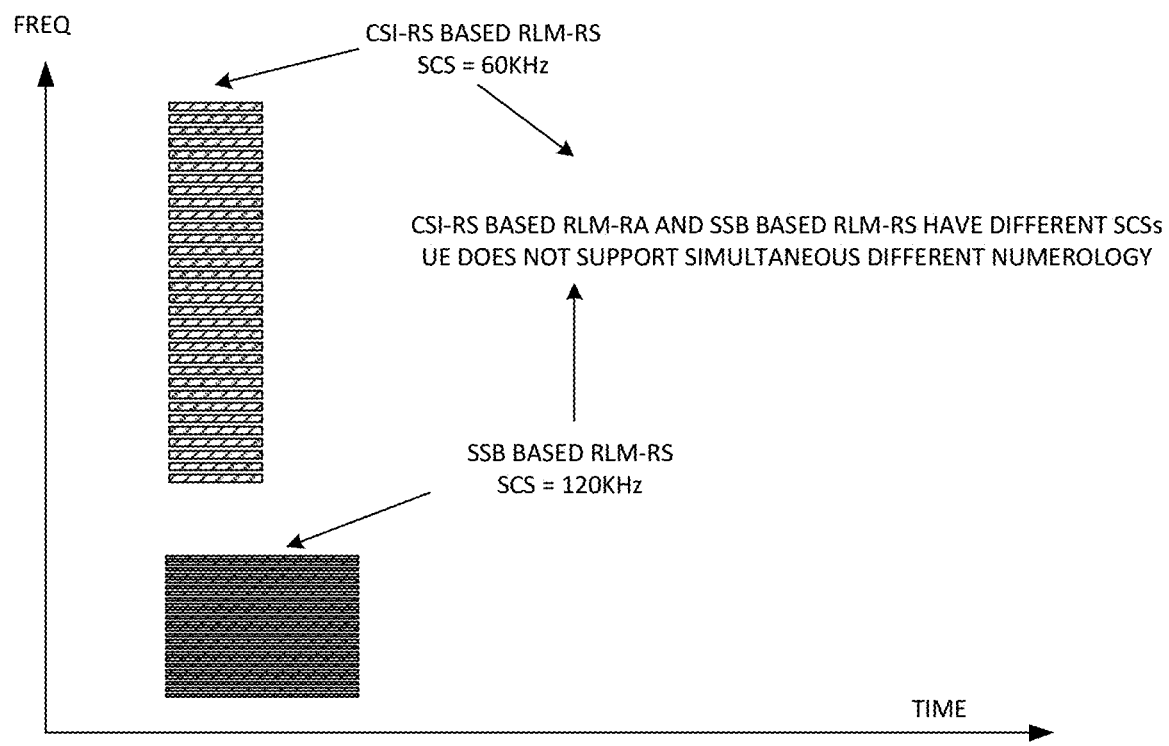
FIG. 4 illustrates SSB based RLM-RS and CSI-RS based RLM-RS configured with different numerologies and corresponding RLM mechanism.

FIG. 4 illustrates SSB based RLM-RS and CSI-RS based RLM-RS configured with different numerologies and corresponding RLM mechanism. In NR, different numerologies are supported with different OFDM frame format, e.g., different subcarrier spacing (SCS), and cyclic prefix (CP) length. Different SCS may include 60 KHz, 120 KHz, 240 KHz, 480 KHz, etc. CSI-RS based RLM-RS and SSB based RLM-RS are configurable over the same or different OFDM symbols having the same or different numerologies. As shown in FIG. 4, CSI-RS based RLM-RS and SSB based RLM-RS are multiplexed in the same OFDM symbol but do not have the same SCS, and UE may not support simultaneous receiving over different numerologies. For example, in the same OFDM symbol, CSI-RS based RLM-RS is configured with SCS=60 KHz, and SSB based RLM-RS is configured with SCS=120 kHz.

When UE does not support simultaneous reception over different numerologies (e.g., different SCS or different CP length), SSB for RLM and RLM CSI-RS resources should be TDMed configured to UE. UE will not perform SSB based RLM and CSI-RS based RLM simultaneously. Instead, UE performs SSB based RLM or CSI-RS based RLM one at a time. Note the definition for TDMed configuration means that the configured SSB and CSI-RS resources should be completely not overlapped in time domain, e.g., they do not have any overlapping in time domain. In other words, the configured SSB and CSI-RS resources should not have any overlapping and should not have any partial overlapping, especially when the OFDM symbol lengths for SSB and CSI-RS resources are different.

For RLM, UE needs to evaluate whether the downlink radio link quality on the configured RLM-RS resource estimated over a first evaluation period becomes worse than a first threshold within the first evaluation period $T_{EVALUATE\_out\_SSB}$. UE also needs to evaluate whether the downlink radio link quality on the configured RLM-RS resource estimated over a second evaluation period becomes better than a second threshold within the second evaluation period $T_{EVALUATE\_in\_SSB}$. For FR1 and FR2, the length of the evaluation period depends on N (RX beam scaling factor) and P (evaluation scaling factor), which in turn depends on how RLM-RS resources and SMTC occasions are configured for UE. SMTC is configured by the network through System Information or RRC signaling after UE is connected to the network (i.e., UE can know SMTC of other cells. The configuration parameters for SMTC include offset, duration, and periodicity. In general, SSBs inside SMTC are used for L3 measurements, and SSBs outside SMTC are used for Li measurements (e.g., RLM).

Both $T_{EVATUATE\_out\_SSB}$ and $T_{EVALUATE\_in\_SSB}$ are defined for FR1 and FR2 in the 3GPP specification. For FR1, $P=1/(1-T_{SSB}/MGRP)$, when in the monitored cell there are measurement gaps configured for intra-frequency, inter-frequency or inter-RAT measurements, which are overlapping with some but not all occasions of the SSB; P=1, when the monitored cell there are no measurement gaps overlapping with any occasion of the SSB. For FR2, $P=1/(1-T_{SSB}/T_{SMTCperiod})$ when RLM-RS is not overlapped with measurement gap and RLM-RS is partially overlapped with SMTC occasion ($T_{SSB}<T_{SMTCperiod}$); P=3, when RLM-RS is not overlapped with measurement gap and RLM-RS is fully overlapped with SMTC period ($T_{SSB}=T_{SMTCperiod}$); $P=1/(1+T_{SSB}/MGRP-T_{SMTCperiod})$ when RLM-RS is partially overlapped with measurement gap and RLM-RS is partially overlapped with SMTC occasion ($T_{SSB}<T_{SMTCperiod}$) and SMTC occasion is not overlapped with measurement gap and ($T_{SMTCperiod} \neq MGRP$) or ($T_{SMTCperiod}=MGRP$ and TSSB<0.5*$T_{SMTCperiod}$); $P=1/(1-T_{SSB}/MGRP)*3$, when RLM-RS is partially overlapped with measurement gap and partially overlapped with SMTC occasion ($T_{SSB}<T_{SMTCperiod}$) and SMTC occasion is not overlapped with measurement gap and $T_{SMTCperiod}=MGRP$ and TSSB=0.5*$T_{SMTCperiod}$; $P=1/\{1\ \ T_{SSB}/min(T_{SMTCperiod}=MGRP)\}$, when RLM-RS is partially overlapped with measurement gap and RLM-RS is partially overlapped with SMTC occasion ($T_{SSB}<T_{SMTCperiod}$) and SMTC occasion is partially or fully overlapped with measurement gap; $P=1/(1-T_{SSB}/MGRP)*3$, when RLM-RS is partially overlapped with measurement gap and RLM-RS is fully overlapped with SMTC occasion ($T_{SSB}=T_{SMTCperiod}$) and SMTC occasion is partially overlapped with measurement gap ($T_{SMTCperiod}<MGRP$). Similarly, the above definition also works for CSI-RS based RLM, it reuses the evaluation time by replacing $T_{SSB} \rightarrow T_{CSI-RS}$.

Figure 5:
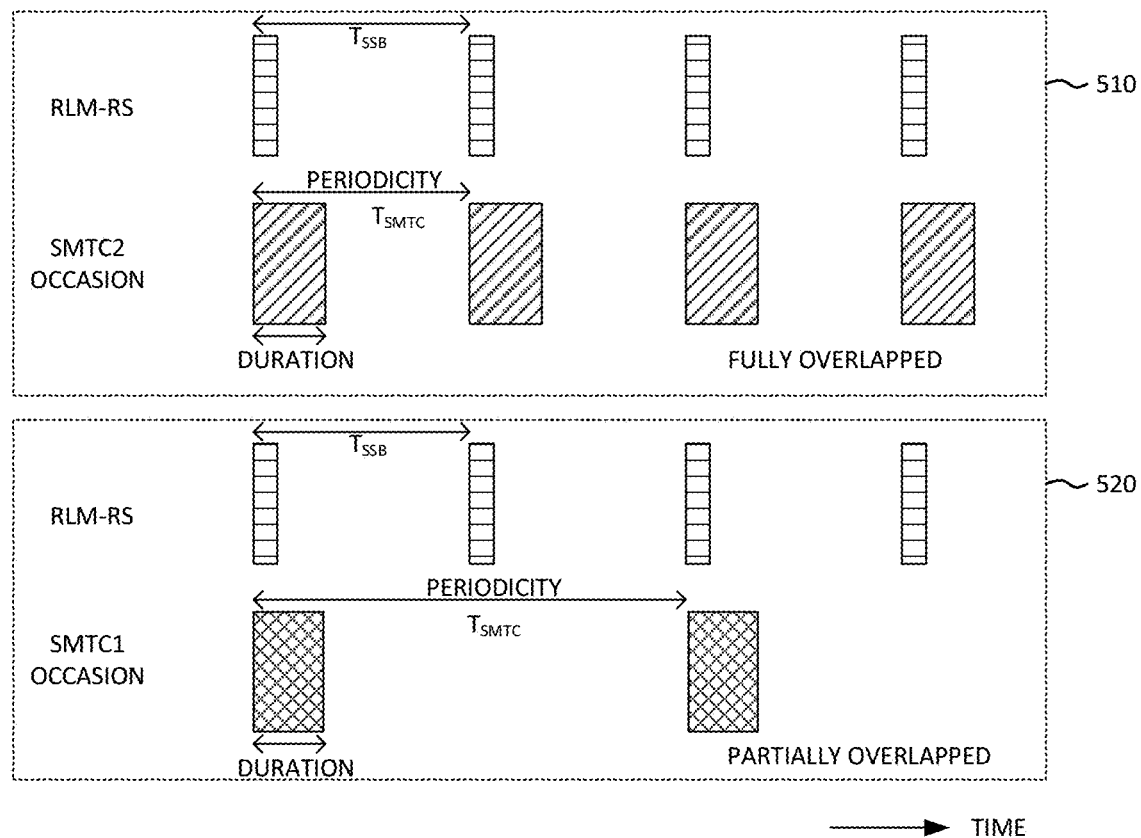
FIG. 5 illustrates RLM evaluation period determination based on SMTC configuration in accordance with one novel aspect of the present invention.

FIG. 5 illustrates RLM evaluation period determination based on RLM-RS and SMTC configuration in accordance with one novel aspect of the present invention. As explained above, when RLM-RS collides with SMTC occasion in FR2, the evaluation scaling factor P is introduced and it depends on the measurement gap (MGRP), the RLM-RS (SSB) periodicity ($T_{SSB}$), and the SMTC periodicity ($T_{SMTCperiod}$) As depicted in 510, RLM-RS are fully overlapped with SMTC2; while as depicted in 520, RLM-RS are partially overlapped with SMTC1. However, multiple SMTC may be configured. For example, smtc1 is the primary measurement timing configuration. In addition, smtc2 is the secondary measurement timing configuration, for SS corresponding to a measurement object with PCI listed in PCI-List. For these SS, the periodicity is indicated by periodicity in smtc2 and the timing offset is equal to the offset indicated by periodicityAndOffset modulo periodicity. The periodicity in smtc2 can only be set to a value strictly shorter than the periodicity indicated by periodicityAndOffset in smtc1 (e.g. if periodicityAndOffset indicates sf10, periodicity can only be set of sf5, if periodicityAndOffset indicates sf5, smtc2 cannot be configured). If smtc2 is present, UE is configured with two SMTC configurations. These two SMTCs, smtc1 and smtc2, must have same Duration and Offset but they may have different Periodicity values. Accordingly, if smtc2 is present, to avoid ambiguity on deriving the evaluation scaling factor P in FR2, the $T_{SMTCperiod}$ is set to be equal to min (smtc1 Periodicity, smtc2 Periodicity). In one preferred embodiment, SMTC2 is always shorter than SMTC1, e.g. min (smtc1 Periodicity, smtc2 Periodicity)=smtc2 Periodicity.

Figure 6:
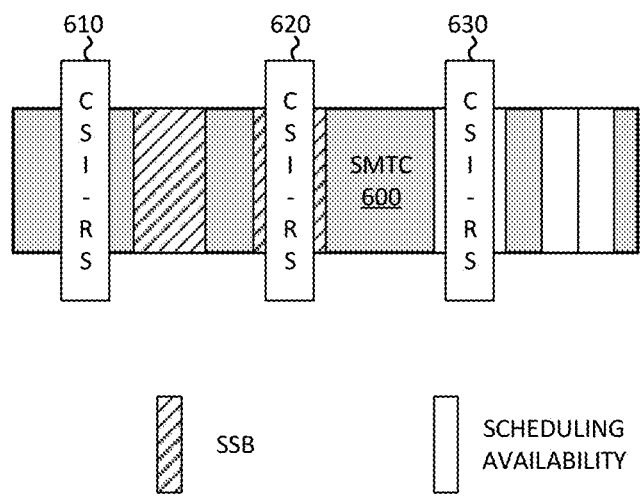
FIG. 6 illustrates one embodiment of determining whether SMTC and RLM-RS are overlapped for determining RLM evaluation period length.

FIG. 6 illustrates one embodiment of determining whether SMTC and CSI-RS based RLM-RS are overlapped for determining RLM evaluation period length. The evaluation scaling factor P depends on whether SMTC occasion and CSI-RS based RLM-RS are overlapped or not. However, the definition on overlap between CSI-RS based RLM-RS and SMTC occasion is ambiguous so that determination of CSI-RS based RLM evaluation period remains ambiguous. There can be different scenarios of how RLM CSI-RS and SMTC are overlapped. In a first scenario, as depicted by CSI-RS 610, the CSI-RS resource is located within the SMTC window duration. In a second scenario, CSI-RS 620 resource is located within the SMTC window duration and also within an SSB. In a third scenario, CSI-RS 630 resource is located within the SMTC window duration, but also within a scheduling availability. Accordingly, UE determines that the SMTC window duration and the CSI-RS based RLM-RS are overlapped as long as the RLM CSI-RS resource is within the SMTC window duration, regardless whether the RLM CSI-RS is located within an SSB or located within a scheduling availability inside SMTC occasion.

Figure 7:
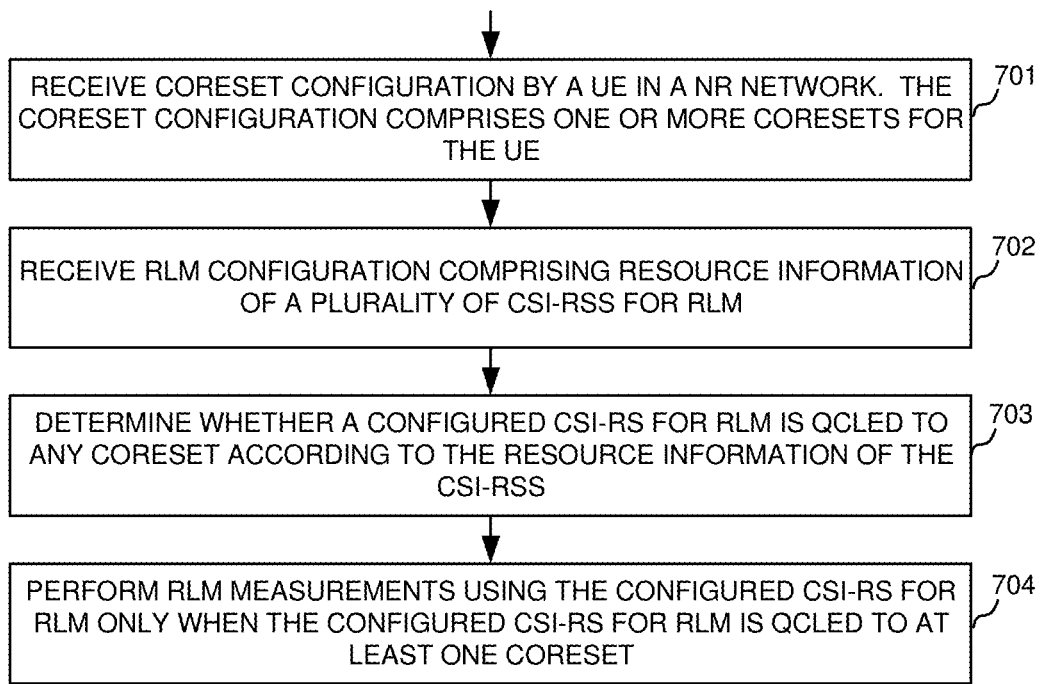
FIG. 7 is a flow chart of a method for CSI-RS based RLM measurements and in accordance with embodiments of the current invention.

FIG. 7 is a flow chart of a method for CSI-RS based RLM measurements and in accordance with embodiments of the current invention. In step 701, a UE receives core resource set (CORESET) configuration in a new radio (NR) network. The CORESET configuration comprises one or more CORESETs for the UE. In step 702, the UE receives radio link monitoring (RLM) configuration comprising resource information of a plurality of channel state information reference signals (CSI-RSs) for RLM. In step 703, the UE determines whether a configured CSI-RS for RLM is Quasi-Co-Located (QCLed) to any CORESET according to the resource information of the CSI-RSs. In step 704, the UE performs RLM measurements using the configured CSI-RS for RLM only when the configured CSI-RS for RLM is QCLed to at least one CORESET.

Figure 8:
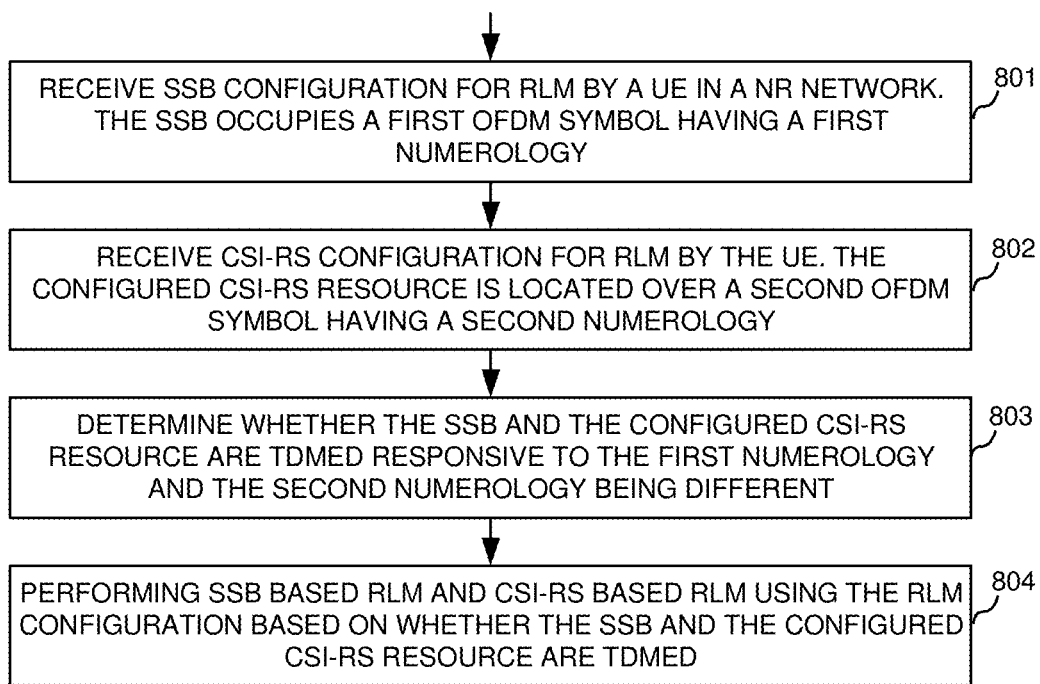
FIG. 8 is a flow chart of a method for SSB based and CSI-RS based RLM measurements in accordance with embodiments of the current invention.

FIG. 8 is a flow chart of a method for SSB based and CSI-RS based RLM measurements in accordance with embodiments of the current invention. In step 801, a UE receives synchronization signal block (SSB) configuration for radio link monitoring (RLM) in a new radio (NR) network. The SSB occupies a first OFDM symbol having a first numerology. In step 802, the UE receives channel state information reference signal (CSI-RS) configuration for RLM. The configured CSI-RS resource is allocated over a second OFDM symbol having a second numerology. In step 803, the UE determines whether the SSB and the configured CSI-RS resource are time division multiplexed (TDMed) responsive to the first numerology and the second numerology being different. In step 804, the UE performs SSB based RLM and CSI-RS based RLM using the SSB and CSI-RS configuration for RLM and based on whether the SSB and the CSI-RS resource are TDMed.

Figure 9:
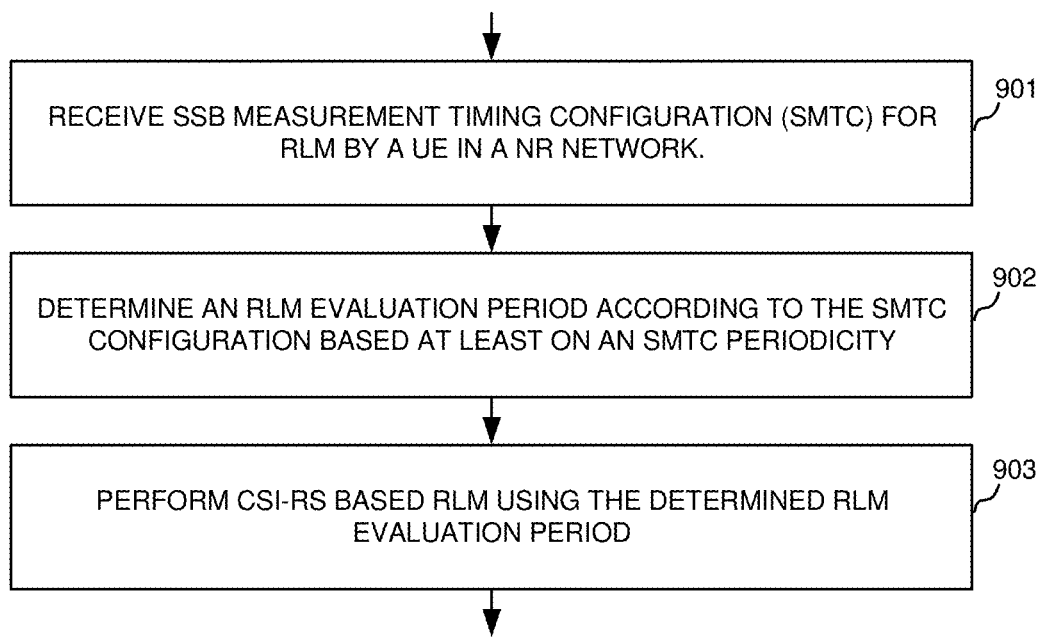
FIG. 9 is a flow chart of a method for RLM and RLM evaluation period determination in accordance with embodiments of the current invention.

FIG. 9 is a flow chart of a method for RLM and RLM evaluation period determination in accordance with embodiments of the current invention. In step 901, a UE receives synchronization signal block (SSB) measurement timing configuration (SMTC) for radio link monitoring (RLM) in a new radio (NR) network. In step 902, the UE determines an RLM evaluation period according to the SMTC configuration based at least on an SMTC periodicity. In step 903, the UE performs CSI-RS based RLM using the determined RLM evaluation period.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   receiving channel state information reference signal (CSI-RS) configuration from a network for radio link monitoring (RLM) by a user equipment (UE);
   receiving a first synchronization signal block (SSB) measurement timing configuration (SMTC) and a second SMTC by the UE; and
   determining an RLM evaluation period for the RLM based on the shortest SMTC periodicity of the first SMTC and the second SMTC, wherein the determining the RLM evaluation period is further based on an RLM evaluation scaling factor for CSI-RS based RLM, and the RLM evaluation scaling factor is associated with whether CSI-RS resources and SMTC window durations are overlapped.

2. The method of claim 1, wherein each SMTC configuration comprises an SMTC periodicity, an SMTC window duration, and a timing offset.

3. The method of claim 2, wherein the first SMTC has a first SMTC periodicity of smtc1, wherein the second SMTC has a periodicity of a smtc2, and wherein smtc1 and smtc2 are configured by the network.

4. The method of claim 3, wherein the shortest SMTC periodicity is smtc2.

5. The method of claim 3, and wherein the RLM evaluation period is determined based on smtc2.

6. The method of claim 1, wherein a CSI-RS resource and an SMTC window duration are considered overlapped as long as the CSI-RS resource is allocated within the SMTC window duration.

7. A User Equipment (UE), comprising:
a radio link monitoring (RLM) configuration circuit that obtains channel state information reference signal (CSI-RS) configuration from a network for radio link monitoring (RLM);
a receiver that receives a first synchronization signal block (SSB) measurement timing configuration (SMTC) and a second SMTC from the network; and
an RLM control and handling circuit that determines an RLM evaluation period for the RLM based on the shortest SMTC periodicity of the first SMTC and the second SMTC, wherein the determining the RLM evaluation period is further based on an RLM evaluation scaling factor for CSI-RS based RLM, and the RLM evaluation scaling factor is associated with whether CSI-RS resources and SMTC window durations are overlapped.

8. The UE of claim 7, wherein each SMTC configuration comprises an SMTC periodicity, an SMTC window duration, and a timing offset.

9. The UE of claim 8, wherein the first SMTC has a first SMTC periodicity of smtc1, wherein the second SMTC has a periodicity of a smtc2, and wherein smtc1 and smtc2 are configured by the network.

10. The UE of claim 9, wherein the shortest SMTC periodicity is smtc2.

11. The UE of claim 9, and wherein the RLM evaluation period is determined based on smtc2.

12. The UE of claim 7, wherein a CSI-RS resource and an SMTC window duration are considered overlapped as long as the CSI-RS resource is allocated within the SMTC window duration.

* * * * *